US006997434B2

(12) United States Patent
Scott

(10) Patent No.: US 6,997,434 B2
(45) Date of Patent: Feb. 14, 2006

(54) TWIST CAM VALVE

(75) Inventor: Richard E. Scott, Naples, FL (US)

(73) Assignee: Shaw Aero Devices, Inc., Naples, FL (US)

( * ) Notice: Subject to any disclaimer, the term of this patent is extended or adjusted under 35 U.S.C. 154(b) by 63 days.

(21) Appl. No.: 10/841,371

(22) Filed: May 6, 2004

(65) Prior Publication Data

US 2004/0251442 A1 Dec. 16, 2004

Related U.S. Application Data

(60) Provisional application No. 60/469,076, filed on May 7, 2003.

(51) Int. Cl.
*F16K 51/00* (2006.01)
(52) U.S. Cl. .................. 251/144; 251/227; 251/254; 251/263
(58) Field of Classification Search ............... 251/144, 251/215, 227, 254, 263
See application file for complete search history.

(56) References Cited

U.S. PATENT DOCUMENTS

| 3,698,420 A | * | 10/1972 | Grundy et al. | ......... 137/329.06 |
| 3,703,189 A | * | 11/1972 | Koller | .................... 137/329.06 |
| 4,351,355 A | * | 9/1982 | Koller et al. | .......... 137/329.06 |
| 4,880,029 A | | 11/1989 | Koller | |

* cited by examiner

*Primary Examiner*—Edward K. Look
*Assistant Examiner*—John K. Fristoe, Jr.
(74) *Attorney, Agent, or Firm*—Morgan, Lewis & Bockius LLP

(57) ABSTRACT

A drain valve including a housing, a poppet, a seal, a follower pin, and a biasing mechanism. The housing defines a passage there-through from a first end to a second end, a cam surface at the second end with at least two detents therein, and at least one slot in the housing fluidly coupling the passage to exterior of the housing. The poppet is disposed within the passage. The seal is disposed between the housing and the poppet. The follower pin is coupled to the poppet near the poppet second end. The follower pin is configured to move along the cam surface and settle in at least one of the at least two detents. The spring is configured to bias the poppet away from the second end.

20 Claims, 5 Drawing Sheets

TWIST CAM VALVE

The present application claims priority to U.S. Provisional Patent Application No. 60/469,076, filed May 7, 2003, which application is incorporated herein by reference in its entirety.

BACKGROUND OF THE INVENTION

1. Field of the Invention

This invention relates to a drain valve. In particular, the invention relates to a drain valve for aircraft fuel tanks that is simpler to operate, and, therefore, less prone to breakage.

2. Description of Related Art

Aircraft fuel tanks generally require drain valves located at the low points of the fuel tanks in order to remove water caused by condensation. These drain valves are also used to sample the fuel for contamination. Existing drain valves require the operator to perform a sequential, push-and-turn operation to open the valve. A different, sequential, push-and-turn operation is required to close the valve. If the operator wishes to change the valve seal by operating the valve to the "service" position, another, different, sequential, push-and-turn motion is required. Since valves that are made by different manufacturers are operated by means of different, sequential, push-and-turn operations, the operator must try to ascertain how a given valve is operated. If the information is not available, the operator is forced to experiment with various motions, and consequently, drain valve breakage occurs in some cases. An example of such a drain valve is disclosed in U.S. Pat. No. 4,880,029, which is incorporated by reference herein.

Accordingly, a twist cam valve that addresses the drawbacks of the prior art would be highly desirable.

BRIEF SUMMARY OF THE INVENTION

According to the invention, there is provided a drain valve including a housing, a poppet, a seal, a follower pin, and a biasing mechanism. The housing defines a passage therethrough from a first end to a second end. The housing also defines a cam surface at the second end with at least two detents therein. In addition, the housing defines at least one slot in the housing fluidly coupling the passage to exterior of the housing. The poppet is disposed within the passage. The seal is disposed between the housing and the poppet. The follower pin is coupled to the poppet. The follower pin is configured to move along the cam surface and settle in the at least two detents. The spring is configured to bias the poppet away from the second end. In use the poppet is configured to move along its longitudinal axis when rotated. The invention simplifies the operation of a drain valve to only a rotary actuation by an operator, instead of requiring the operator to use a sequential combination of axial pushing and rotary motion.

The present invention provides a means of operation wherein the drain valve is operated from an "open" position, to a "closed" position, and to a "service" position by a simple, rotary, turning motion. No complicated or uniquely sequential motions are required to operate the drain valve. A stationary cam surface guides the internal portion of the valve axially to each position as the internal portion of the valve is turned. The invention provides for a detent in the cam at each distinct position, i.e., open, closed, and service, so that the valve is positively held in position when it reaches each of the three operating positions. The operator can feel, hear, and see when the valve reaches the desired position. Accordingly, attempting to operate the drain valve by pushing, turning, or a combination of both pushing and turning is not required, thereby avoiding damaging the drain valve.

BRIEF DESCRIPTION OF THE DRAWINGS

For a better understanding of the nature and objects of the invention, reference should be made to the following detailed description, taken in conjunction with the accompanying drawings, in which.

DETAILED DESCRIPTION OF THE INVENTION

Figure 1:
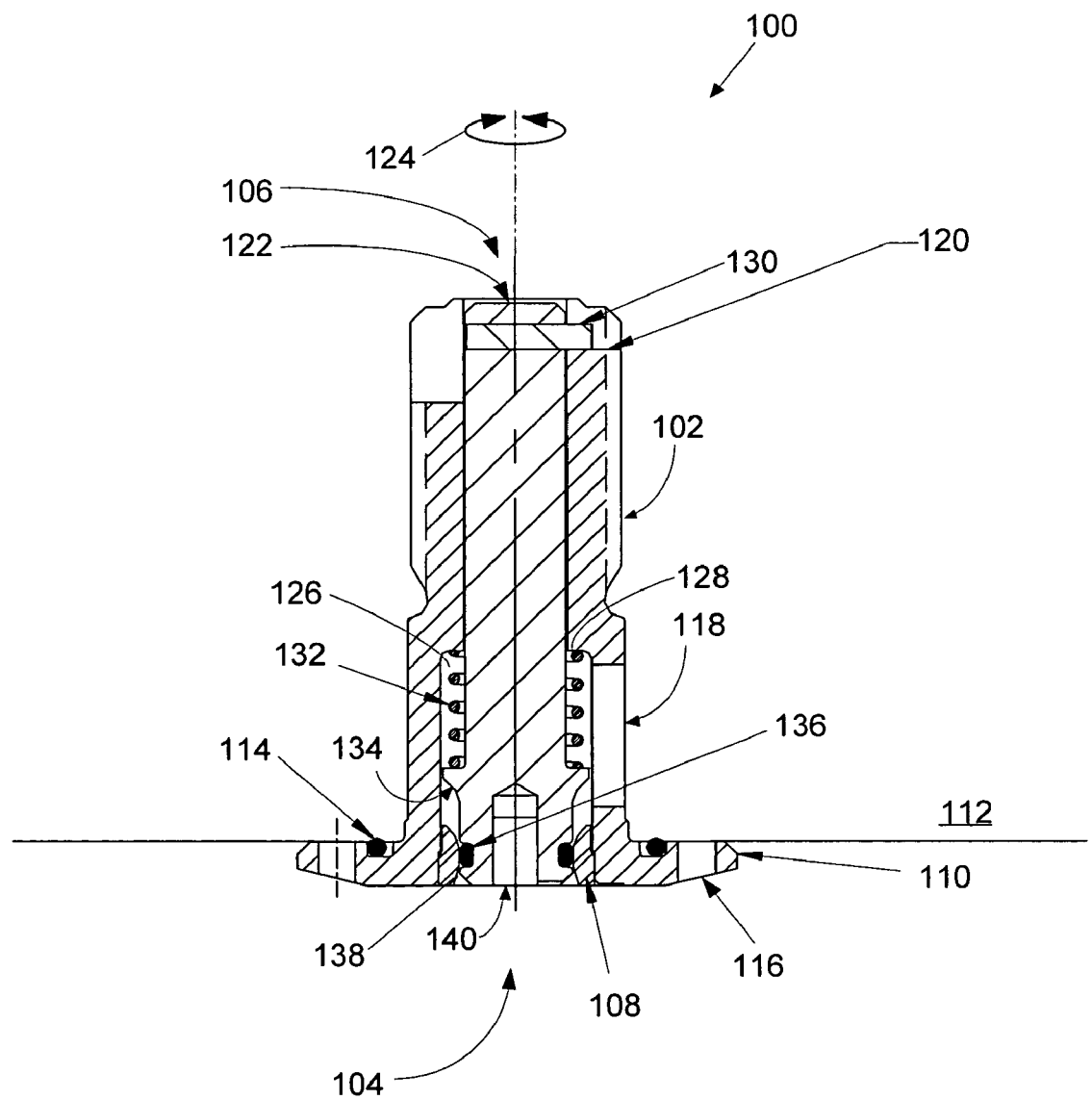
FIG. 1 is a cross-sectional view of a drain valve according to an embodiment the present invention.

FIG. 1 is a cross-sectional view of a drain valve 100 according to an embodiment the present invention. The drain valve 100 comprises a housing 102 having a first end 104 and a second end 106. The housing 102 also defines a passage through the housing 102 that connects openings at the first and second ends of the housing. The passage preferably has a circular cross-section, i.e., the housing is formed by a cylindrical side wall extending from the first end to the second end.

An annular insert 108 is coupled to the housing 102 within the opening at the first end of the housing. In a preferred embodiment, the insert 108 is coupled to the housing 102 by thermal welding.

The housing also preferably includes a flange or lip 110 that extends substantially perpendicular to a longitudinal axis of the housing 102 at the first end 104. When installed, the housing extends into a fuel tank 112 such that the flange or lip 110 rests against the outside surface of the fuel tank. An annular seal 114 is preferably installed between the flange 110 and the exterior wall of the fuel tank 112 to prevent fluid from leaking from the fuel tank. Holes 116 may also be provided in the flange for fastening the flange 110 to the exterior wall of the fuel tank 112.

Further, the housing 102 preferably defines one or more slots 118 in the side wall thereof for fluid communication between the fuel tank 112 and the passage formed within the housing 102. The housing 102 also preferably defines a cam surface 120 at the second end 106 of the housing 102. The cam surface is described in further detail below in relation to FIG. 2. The housing 102 also preferably defines a chamber 126. The chamber 126 has a diameter slightly larger than the passage. The chamber 126 is defined between the side wall of the housing and the poppet 122 (described below), and the insert 108 and a shelf 128. The shelf 128 defines a step between the diameter of the chamber and the diameter of the passage.

The drain valve 100 also preferably includes a poppet 122. The poppet 122 is an upright member that rises perpendicularly to plug or unplug the opening at the first end of the housing. In a preferred embodiment, the poppet 122 is a solid cylindrical shaft having a first end, near the housing's first end, and a second end, near the housing's second end. The poppet 122 preferably has a diameter slightly smaller than the diameter of the passage defined by the housing. The poppet 122 is configured to both rotate within the passage formed by the housing 102, as shown by arrow 124, and move transversely within the passage in a direction parallel to the poppet's and housing's longitudinal axis.

A follower pin 130 is preferably coupled to the poppet 103, such that the follower pin travels along the cam surface 120 of the housing 102, as described below in relation to FIG. 2. The follower pin 130 may be screwed into a hole in the poppet or attached by any other suitable means. A biasing mechanism 132, such as a compression spring, is positioned within the chamber 126. One end of the biasing mechanism 132 rests against the shelf 128 of the housing 102, while the other end of the biasing mechanism 132 rests against a lip 134 that extents substantially perpendicularly from the poppet. The lip 134 preferably has a diameter slightly smaller than the diameter of the chamber 126.

A seal 136 is preferably disposed between the poppet and the insert 108 near the first ends of the poppet and the housing. In a preferred embodiment, the seal 136 is disposed within an annular groove formed in the poppet near the poppet's first end. The annular groove is preferably substantially perpendicular to the longitudinal axis of the poppet and has a diameter slightly smaller than the poppet. In an alternative embodiment, a lubricant 138 may be used.

In another embodiment, the housing 102 may have a protruding lip (not shown) at the opening near the housing's first end to cause fluid emanating from the valve to drip free of the fuel tank surface.

A rotation mechanism 140 formed at one end of the poppet 122 is provided to drive the rotate the poppet, as indicated by arrow 124. In one embodiment the rotation mechanism 140 is a depression or slot, such as a hexagonal depression or a depression for receiving a regular or PHILLIPS screwdriver head, into which a tool can be inserted to turn the poppet 122. The poppet 122, housing 102, and insert 108 are preferably made from a metallic or non-metallic material, although any other suitable material may be used.

Figure 2:
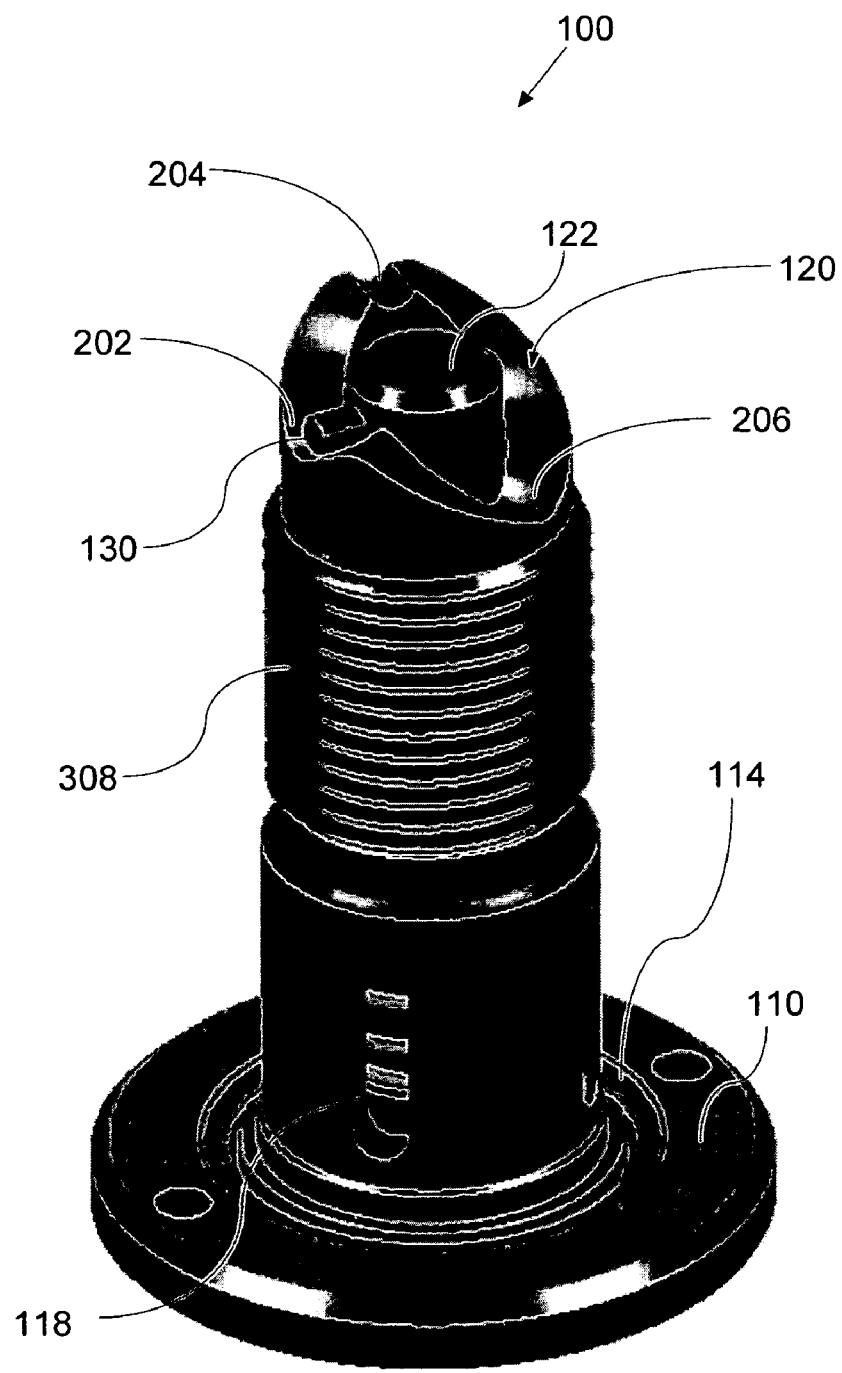
FIG. 2 is an isometric view of the drain valve shown in FIG. 1.

FIG. 2 is an isometric view of the drain valve 100 shown in FIG. 1. In a "closed" position, the poppet 122 is located as shown in FIG. 1, with the seal 136 (FIG. 1) engaged with insert 108 (FIG. 1), thereby preventing fluid flow through the drain valve. In this "closed" position, the follower pin 130 settles in a closed notch or detent 202 in the cam surface 120 formed in the housing 102 at the second end 106 of the housing 102. In this position, the follower pin 130 is held in place by the biasing mechanism 132 acting between the poppet 122 and an internal shelf 128 in the housing.

When the poppet 122 is rotated to an "open" position, the follower pin 130 leaves the "closed" notch, slides along the cam surface 120, and is raised by the cam to the open notch or detent 204, thereby displacing the poppet 122 axially inward away from the insert 108 (FIG. 1) and causing the poppet seal 136 (FIG. 1) to become disengaged from the insert 108 (FIG. 1). To do this, an operator must not only turn the poppet 122, but also apply a force in the longitudinal axis direction from the first end 104 toward the second end 106, against the force of the biasing mechanism 132. This change in axial position creates an open path for the fluid to pass from the fuel tank 112 (FIG. 1) through the slot(s) 118 in the housing 102 (FIG. 1) to the exterior of the fuel tank 112 (FIG. 1). In other words, fluid communication is facilitated from the fuel tank, through the passage in the housing, and out of the opening in the housing at the housing's first end 104.

In the "open" position, the follower pin 130 engages the open notch or detent 204 in the cam surface 120, and is held in the open notch by the biasing mechanism 132 acting between the poppet 122 and the internal shelf 128 of the housing 102.

When the poppet 122 is rotated further in the same direction, the follower pin 130 disengages from the open notch 204 and slides along the cam surface 120 until the pin reaches a "service" notch or detent 206. In this position, the follower pin 130 is at the lowest portion of the cam surface 120, and is held in that position by the biasing mechanism 132 acting on the poppet 122. In this position, the seal 136 extends outward away from the second end 106 of the housing 102, thereby being accessible for replacement, i.e., the seal 136 extends outward from the tank 112 (FIG. 1). In this service position, the lip or shoulder 134 (FIG. 1) of the poppet 122 contacts the insert 108 to form a seal, thereby blocking fluid flow from the tank out of the fuel tank while the seal 136 is being serviced or replaced.

When the poppet 122 is rotated further in the same direction, the follower pin 130 leaves the service notch or detent 206 and rides up the cam surface 120 until the pin again reaches the "closed" position. The follower pin 130 then again enters the closed notch or detent 202 in the cam surface 120, and is held there by the biasing mechanism 132 acting between the poppet 122 and the housing 102. In the "closed" position, the poppet seal 136 engages the insert 108 and prevents fluid flow through the drain valve 100.

The rotation direction of the poppet is preferably optional. The poppet 122 can be rotated in the either direction to cause the poppet 122 to move from one position to the next position. In another embodiment, the rotation is restricted to one direction by a ratchet mechanism (not shown). However, such an mechanism may cause damage if an operator tries to force the poppet against the ratchet.

Figure 3:
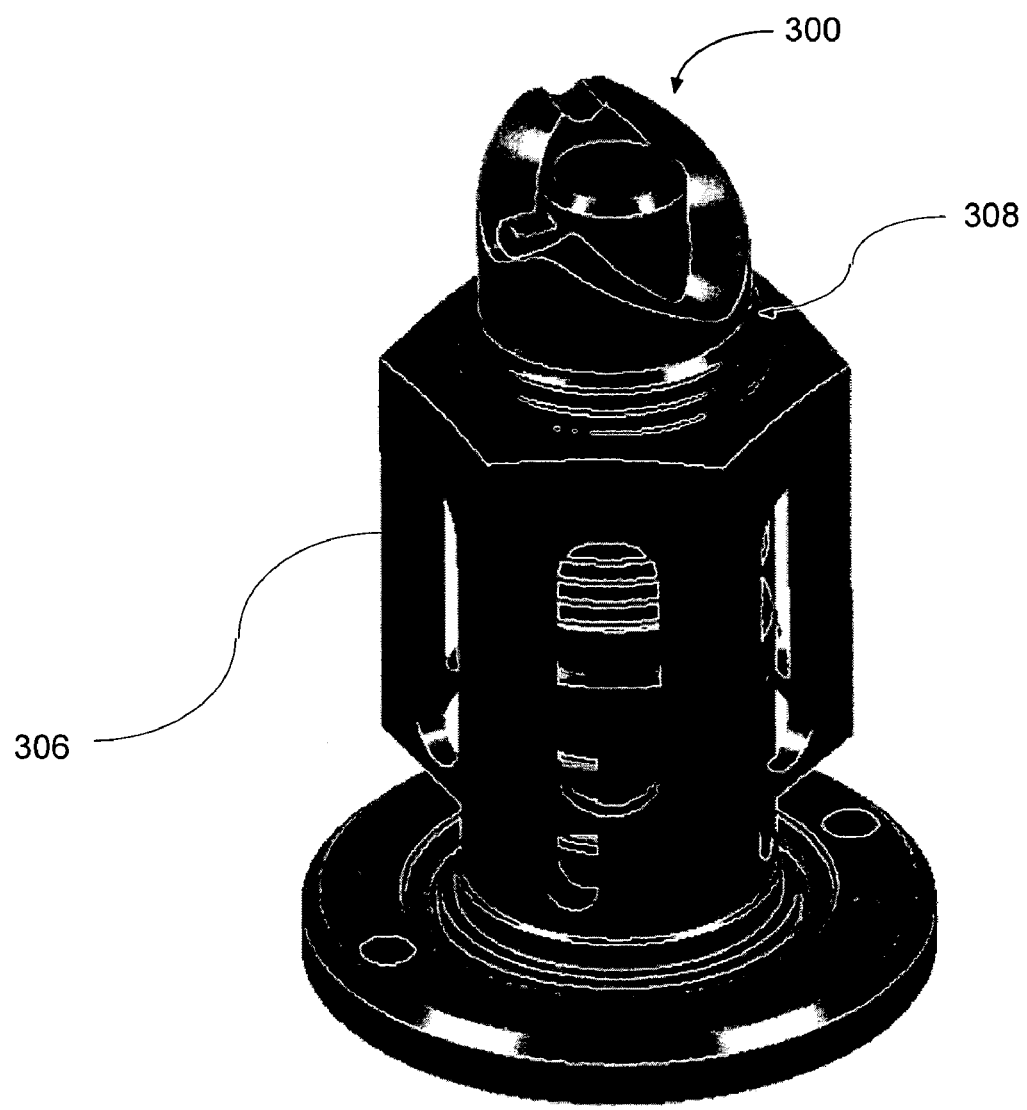
FIG. 3 is an isometric view of another drain valve according to another embodiment of the present invention.

FIG. 3 is an isometric view of another drain valve 300 according to another embodiment of the present invention. This view includes a nut 306 that is used to fasten the drain valve to the fuel tank in some installations. Here, the nut 306 is placed inside the fuel tank and threads 308 on the drain valve 100 are threaded into the nut 306 to secure the drain valve through a wall of the fuel tank.

Figure 4:
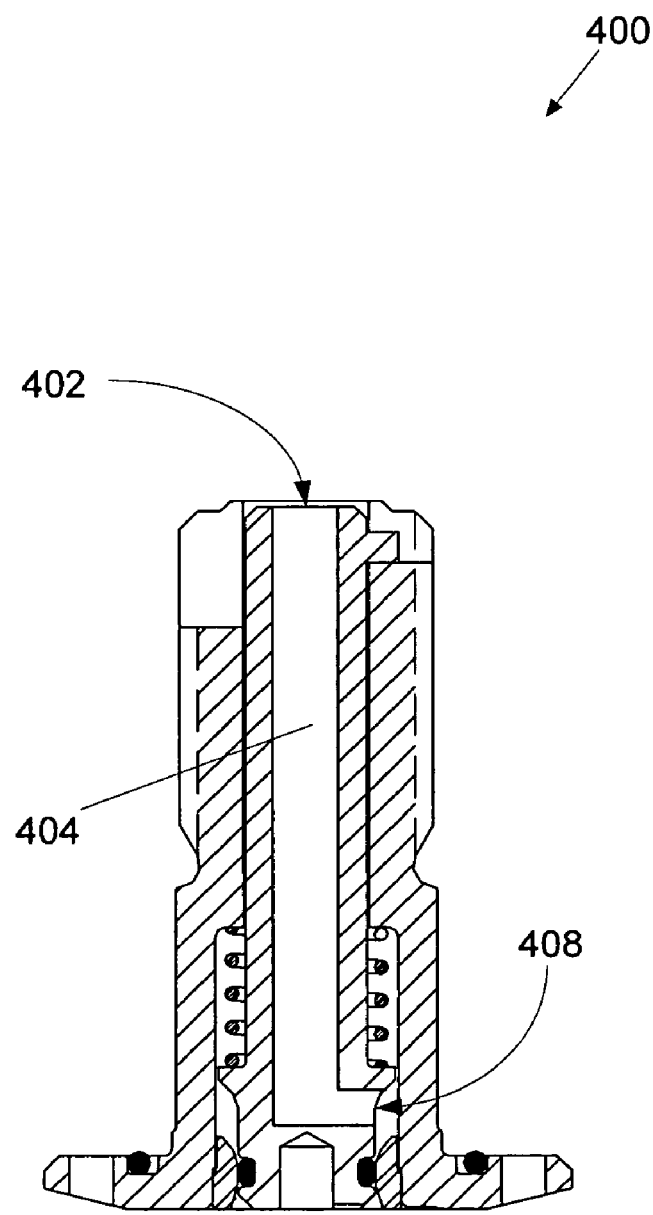
FIG. 4 is a cross-sectional view of another drain valve according to another embodiment the present invention.

FIG. 4 is a cross-sectional side view of another drain valve 400. In this embodiment, the slots 118 (FIG. 1) in the housing are eliminated. Rather, the poppet defines a passage 404 there-through. The poppet also defines an outlet 408 fluidly coupled to the passage 404. In use, when the valve is in the "open" position, fluid flows from the tank through the passage 404, out of the outlet 408, and out through the opening at the housing's first end. In the service position, a seal is formed between the poppet and the insert to close the outlet 408.

Figure 5:
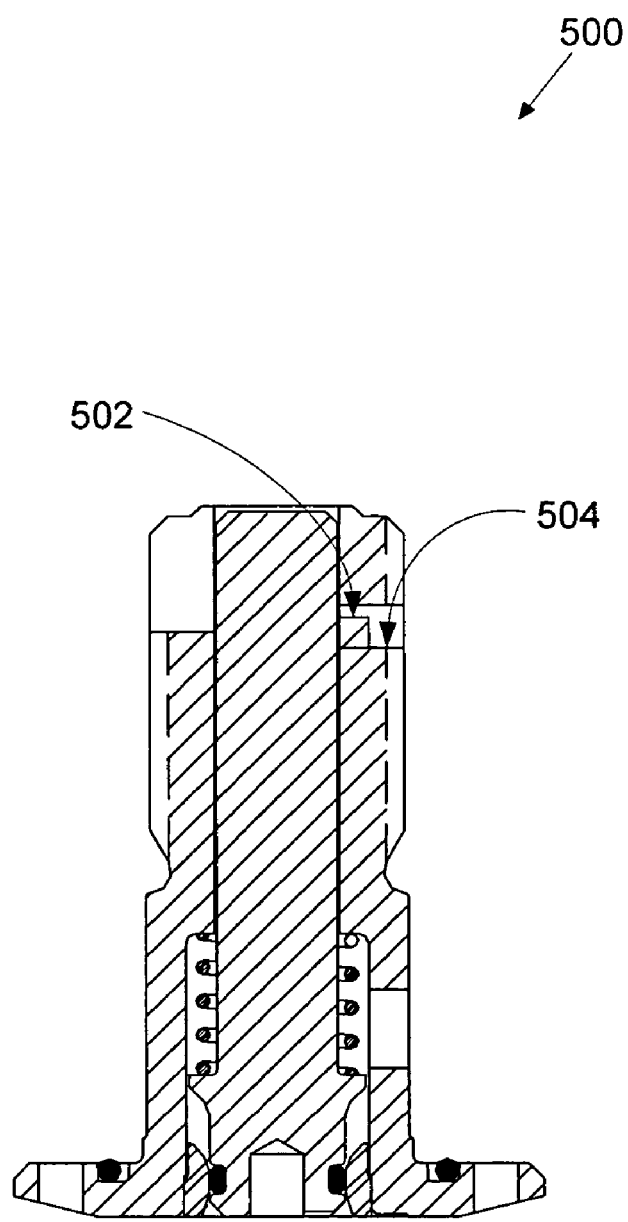
FIG. 5 is a cross-sectional view of yet another drain valve according to yet another embodiment the present invention Like reference numerals refer to corresponding parts throughout the several views of the drawings.

FIG. 5 is a cross-sectional side view of yet another drain valve 500. Here, the cam surface 504 is enclosed within a portion of the housing. This prevents the follower pin 502 from accidentally unseating and moving to a different position. Alternatively, an overhang or guide may be provided above the closed position detent to prevent the follower pin from unseating and opening the valve. This embodiment may be required where an aircraft using the drain valve of the invention operates in a Lightning Zone 1 area, where lightning may unseat the follower pin and open the valve.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. For example, the drain valve may be used in any fluid vessel, not just in fuel tanks. Also, any figures described herein are not drawn to scale. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A drain valve, comprising:
    a housing having a first end and a second end, wherein said housing defines an opening at said first end and a passage extending at least partially through said housing from said opening toward said second end;
    a cam surface coupled to said housing at a location remote from said first end, where said cam surface includes at least two detents each located along said cam surface at different distances from said housing first end;
    a poppet configured to rotate and slide within said passage;
    a biasing mechanism coupled to said poppet and configured to bias said poppet away from said second end; and
    a follower pin coupled to said poppet and configured to travel along said cam surface and settle in said at least two detents.

2. The drain valve of claim 1, wherein said housing is a hollow cylinder extending between said first end and said second end, and said passage is a cylindrical passage extending through said housing from said first end to said second end.

3. The drain valve of claim 1, wherein said housing defines said cam surface at said second end.

4. The drain valve of claim 1, wherein said housing defines said cam surface between said first end and said second end.

5. The drain valve of claim 1, wherein said cam surface includes a third detent located along said cam surface at a different distance from said first end than said at least two detents.

6. The drain valve of claim 1, wherein said biasing mechanism is a spring.

7. The drain valve of claim 6, wherein said spring is disposed within said housing at least partially between said housing and said poppet.

8. The drain valve of claim 1, further comprising an annular insert within said opening.

9. The drain valve of claim 1, further comprising a seal coupled to said poppet such that said seal prevents fluid flow through said opening when said follower pin is in a closed detent of said at least two detents.

10. The drain valve of claim 1, further comprising a flange coupled to said housing at said first end, where said flange extends substantially perpendicular to said housing away from said opening.

11. The drain valve of claim 1, wherein said housing further defines at least one slot in said housing that allows fluid to flow through said at least one slot into said passage.

12. The drain valve of claim 1, further comprising another passage through said poppet.

13. A drain valve, comprising:
    a housing having a first end and a second end remote from said first end, wherein said housing defines:
        a passage through said housing from said first end to said second end;
        a cam surface at said second end with at least two detents therein; and
        at least one slot in said housing fluidly coupling said passage to exterior of said housing;
    a poppet disposed within said passage;
    a follower pin coupled substantially perpendicularly to said poppet, where said follower pin is configured to move along said cam surface and settle in said at least two detents;
    a biasing mechanism configured to bias said poppet away from said second end.

14. The drain valve of claim 13, wherein one of said at least two detents includes a closed detent configured to position said follower pin and said poppet in a position where fluid flow through said at least one slot is prevented by said seal and said poppet.

15. The drain valve of claim 13, wherein one of said at least two detents includes an open position detent configured to position said follower pin and said poppet in a position where fluid flow through said at least one slot is permitted.

16. The drain valve of claim 13, wherein each of said at least two detents are located along said cam surface at different distances from said housing first end.

17. The drain valve of claim 13, wherein said cam surface includes a third detent located along said cam surface at a different distance from said first end than said at least two detents.

18. The drain valve of claim 13, further comprising a seal disposed between said housing and said poppet.

19. The drain valve of claim 13, wherein said biasing mechanism is a spring.

20. The drain valve of claim 19, wherein said spring is disposed within said housing at least partially between said housing and said poppet.

* * * * *